Figure 1:
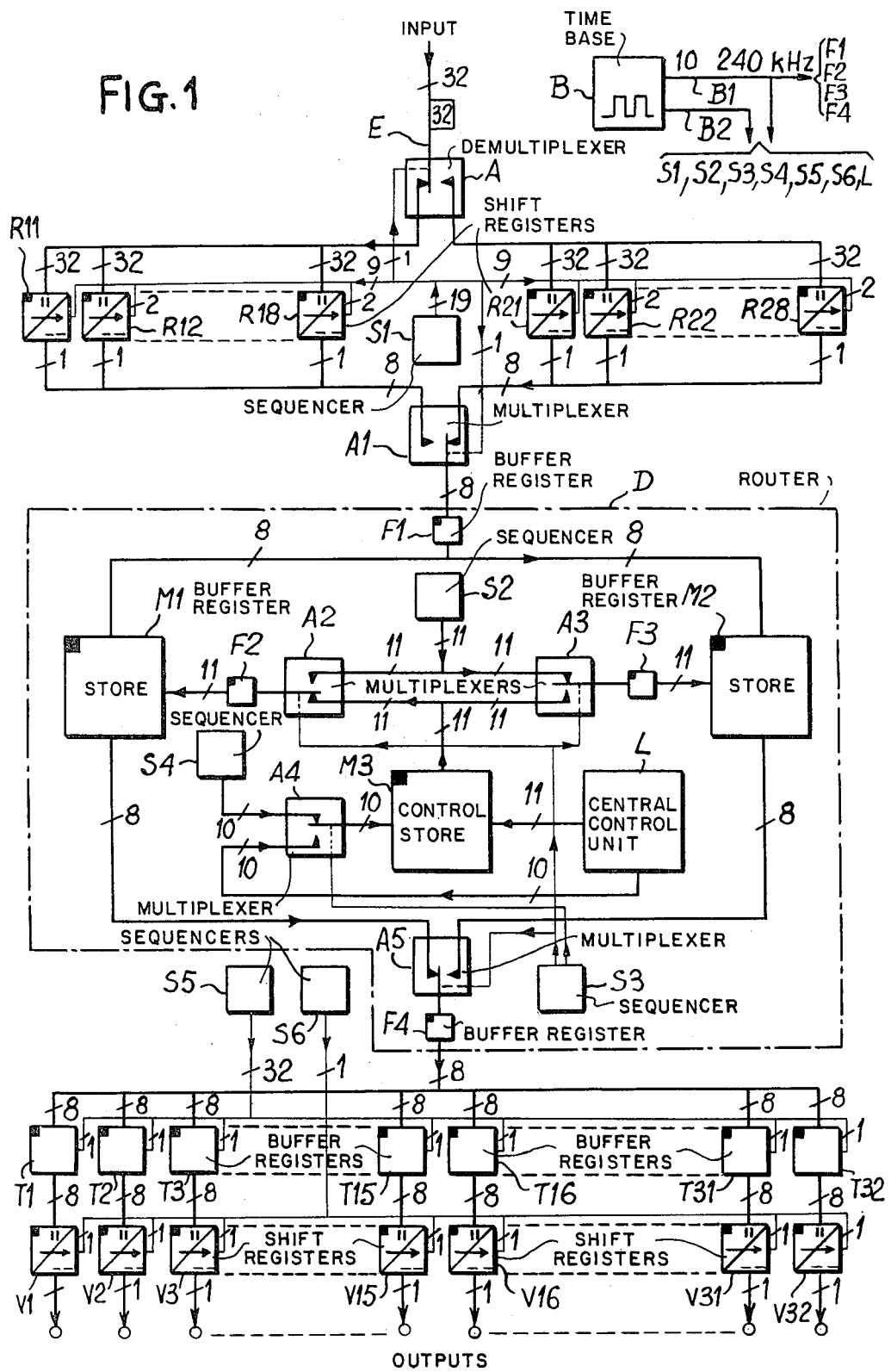

United States Patent [19]

Laneau

[11] 4,092,497
[45] May 30, 1978

[54] CONNECTION NETWORK FOR PCM TDM AUTOMATIC TELEPHONE EXCHANGE EQUIPMENT

[75] Inventor: Gilbert Laneau, Paris, France

[73] Assignee: Jeumont-Schneider, Puteaux, France

[21] Appl. No.: 755,047

[22] Filed: Dec. 28, 1976

[30] Foreign Application Priority Data

Jan. 20, 1976  France .................................. 76 01413

[51] Int. Cl.² ............................................. H04Q 11/04
[52] U.S. Cl. ................................................. 179/15 AT
[58] Field of Search ........ 179/15 AQ, 15 AT, 15 BY, 179/15 BS, 15 A

[56] References Cited

U.S. PATENT DOCUMENTS

| | | | |
|---|---|---|---|
| 3,263,030 | 7/1966 | Stiefel | 179/15 AT |
| 3,602,647 | 8/1971 | Kawashima | 179/15 BY |
| 3,914,553 | 10/1975 | Melindo | 179/15 AT |
| 3,956,593 | 5/1976 | Collins | 179/15 AQ |

*Primary Examiner*—David L. Stewart
*Attorney, Agent, or Firm*—Bacon & Thomas

[57] ABSTRACT

A pulse code modulation (PCM) time division multiplex (TDM) automatic telephone exchange, comprising a series-to-parallel converter having incoming multiplex channel inputs and outputs, corresponding to the number of bits in a bit-group, a routing network having M inputs, each connected to an output of the series-to-parallel converter and a like number of outputs, and having a storage device therein, for simultaneously time and space switching information received in an incoming time slot to an outgoing time slot, and a parallel-to-series converter receiving a bit-group of one of the outgoing time slots on said M routing outputs. The operation of the telephone exchange is controlled by a time based device which synchronizes bit-group transfer in the routing network, the series-to-parallel converter, and the parallel-to-series converter, and also produces a periodic resynchronizing pulse.

8 Claims, 2 Drawing Figures

CONNECTION NETWORK FOR PCM TDM AUTOMATIC TELEPHONE EXCHANGE EQUIPMENT

The invention relates to a connection network for pulse code modulation (PCM) time division multiplex (TDM) automatic telephone exchange equipment, for non-blanking transfer of the octet of a time slot in one of 32 incoming multiplex channels to a time slot in one of 32 outgoing multiplex channels. A connection network of this kind for 1024 time slots can of course be amplified to provide any required number of time slots by the juxtaposition of an adequate number of identical networks.

In some known networks, such as the one described in the applicants' French Patent application No. 73.24 841 of July 6, 1973, a first system of circulating shift registers is provided to store the octets of the various time slots, and a second system of multiplexers is controlled by a third system of circuits preparing address codes in association with the central control unit of the TDM automatic exchange equipment. The disadvantage of such a network is that it needs a large number of items and has a heavy power consumption.

This invention, on the other hand, provides the advantage of greatly reducing the number of components required and therefore of reducing power consumption; also, the network provided by the invention is less bulky than the known network.

The connection network according to the invention is adapted to be interposed between, on the one hand, the outputs of a PCM encoder whose inputs are connected to 32 samplers and, on the other hand, the inputs of 32 PCM decoders. The invention is distinguished by comprising:

- a series-to-parallel converter of the binary elements (bits) of each octet of an incoming time slot, the converter having 32 inputs connected one each to the incoming multiplex channels and having 8 outputs;
- a router having a storage facility and having 8 inputs connected one each to the outputs of the series-to-parallel converter to route an incoming time slot to an outgoing time slot and having 8 outputs;
- a parallel-to-series converter of the bits of each octet of an outgoing time slot coming from the router, and
- a time base for synchronizing octet transfer in the converters and router and producing 10 240 kHz pulses and, every 4 ms, a 100 ns resynchronizing pulse.

The encoded pulses experience a number of transfers as they pass through the series-to-parallel converter and then as they pass through the router and again in the parallel-to-series converter and have therefore been delayed when they leave the connection network to enter the decoders. Their delay must be an exact multiple of the duration or length of a time slot if cross-talk is to be avoided. The necessary delay is ensured by means of the time base.

Also, the 10 240 kHz time base pulses are used to provide an enabling every 100 ns of the buffer registers provided at various parts of the router so as to reduce the spread in the transfer times of the signals through the various circuits.

Figure 2:
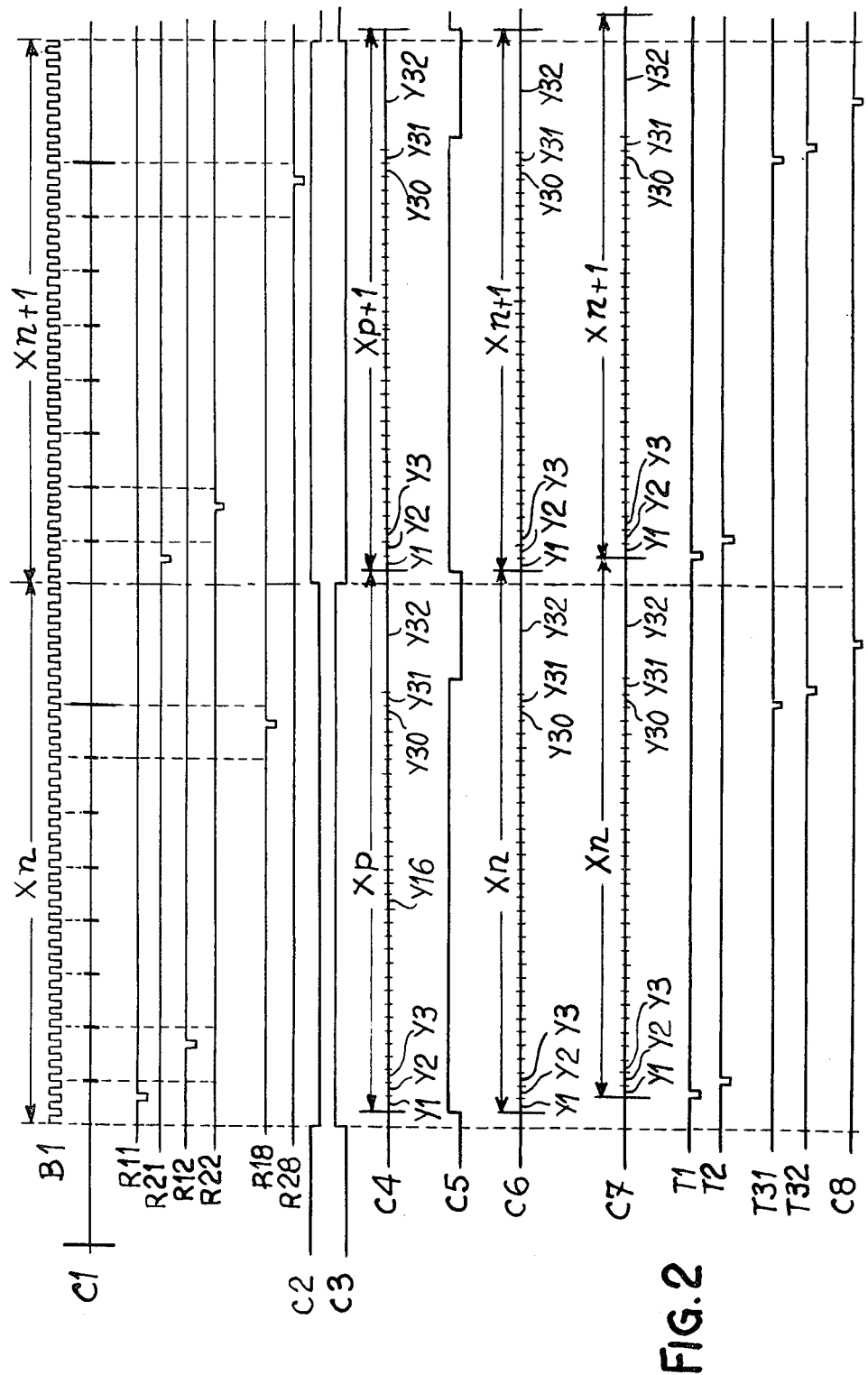

The invention will be more clearly understood from the following description and from the accompanying drawings wherein:

FIG. 1 is a block schematic view of the connection network according to the invention, and FIG. 2 is a timing diagram for two consecutive time slots.

At the top of FIG. 1 there can be seen input E of a connection network embodied by 32 multiplex channels each dealing with 32 time slots, the corresponding 32 incoming wires coming from a group of sampler encoders (not shown). The 32 channels are routed by a demultiplexer A to 1 group of 8 shift registers R 11, R 12, . . . R 18 during one time slot and to another group of 8 identical registers R 21, R 22 . . . R 28 during the next time slot, and so on, so that each octet which embodies each time slot and comprises 8 serially transferred bits is converted into a group of 8 parallel transferred bits at the output of the register group to which the particular bits concerned were routed. Accordingly, each such register, which is of known kind, comprises 32 parallel inputs connected one each to the 32 incoming wires of input E by way of demultiplexer A, and a single series output. The 8 outputs first of one register group and then of the other are connected to a router D having a memory by way of a multiplexer A1 so synchronized with demultiplexer A that the two register groups operate in simplex — i.e., one group is writing-in octets while the group is reading-out octets.

The registers and the integers A, A1 are controlled by a sequencer S 1 in turn controlled by a time base B so that the first bit of each time slot of each channel is written into R 11 (or R 21), the 2nd into R 12 (or R 22) and so on and the 8th into R 18 (or R 28). The 8 bits of the single octet can therefore be collected simultaneously at the output of a register group, the octets of the 32 multiplex channels being delivered consecutively throughout a time slot. The registers therefore receive a charging for input pulse every other time slot from sequencer S 1, and while they are on read-out the 8 registers receive a shift pulse simultaneously every 100 ns, thus receiving a total of 32 pulses. The 32 bits written simultaneously into each register in a write-in cycle are therefore read serially during the immediately following read-out cycle.

Each of the items A, A1 is embodied by 8 electronic two-way switching contacts, hence the reason for A and A1 being represented in diagrammatic form in FIG. 1, which is a single-wire representation, as a single two-way contact in each case.

Time base B supplies the sequencer S1 with two kinds of signal — a 10 240 kHZ signal B1 consisting of pulses having a 50% pulse duty factor, and a single B2 consisting of a pulse lasting 100ns and appearing every 4 ms.

Sequencer S1 has 19 outgoing wires; one is for controlling A and A1, 16 others go one each to registers R 11 to R 18 and R 21 to R 28 to control write-in of the corresponding bit, the 18th is associated with the shift pulses of the registers R 11 to R 18 and the 19th is associated with the shift pulses of the registers R 21 to R 28.

FIG. 2 shows the signal B1 for a period corresponding to the duration of two consecutive time slots Xn and Xn + 1 — i.e., during a period of approximately 8 microseconds.

The signal B2 has been omitted from FIG. 2 for reasons of scale, and the signal controlling A and A1, which change direction simultaneously every 3 900 ns (the length of a time slot), has been omitted for reasons of simplification; however, FIG. 2 does show the signals for charging the registers R 11, R 21, R 12, R 22 and R 18, R 28. As will be apparent from the scale C 1, which shows the positions in time of the various bits of two consecutive octets, R 11 writes in the first or sign bit of the first octet, then R 12 writes in the second bit of the first octet and so on until finally R 28 writes in the 8th bit of the second octet. The lines C 2 and C 3 are the enabling signals for parallel charging of each register group.

The router D with a storage facility (the router being shown in chain-dotted framing in FIG. 1), which serves to transfer the octet from a particular time slot of an incoming multiplex to another particular time slot of an outgoing multiplex, mainly comprises 3 random access stores whose access time is at most 50 ns; the latter stores are embodied as integrated circuits and are now commercially available. Two such stores M1, M2 are stores of encoded PCM samples and can each hold 1024 octets. Their 8 inputs are connected one each to the 8 outputs of A1. The third random access store M3 is the store controlling the two stores M1, M2 operating in simplex and contains 1024 addresses of 11 bits, 10 bits being required for the addressing of the 1024 octets, the 11th bit being an enabling bit for the stores M1 and M2. During a frame of 32 time slots, one of the stores M1 or M2 writes-in while the other reads-out and so on. Accordingly, each of the stores M1, M2 is controlled first by store M3, for read-out, and then by a sequencer S2, for write-in, through the agency of multiplexers A2 and A3, A2 being associated with M1 and A3 with M2. Each of the latter multiplexers is embodied by 11 electronic two-way switching contacts and is so controlled by a sequencer S3 as to change direction every 125 microseconds.

Sequencer S2 is embodied by a pulse counter which advances 1 unit every 100 ns with effect from the start of each time slot and which is inhibited after counting 32 units for the remainder of such time slot — i.e.,, from the 3 200th ns to the 3 900th ns.

Since the central control unit L matches a particular outgoing time slot with a particular incoming time slot in one of the stores M1 or M2 for each direction of speech between two correspondents, the octets can be stored in M1 or M2 in any order; however, once a storage order has been defined, such as the order hereinbefore determined by the output sequences adapted for the registers R11 to R28, it must never be altered.

The central unit L therefore supplies two words of correspondence for each telephone call, each word comprising 10 bits + 1 enabling bit which, for instance, if no call was to be trunked, would have the value 0. During trunking these correspondence words are supplied by an 11-wire line providing a direct connection between L and M3.

The control store M3, which requires only 10 bits, is addressed first by a sequencer S4 similar to S2 but having 10 outputs instead of 11, for read-out addressing, and then by the central unit L, for write-in addressing.

The alternate routing of S4 or of L to the addressing input of M3 is controlled by a multiplexer A4 embodied by 10 electronic two-way switching contacts.

A4 is so controlled by a special output line of sequencer S3 that S4 can output a read-out address to M3 every 100 ns in the first portion of a time slot from 0 to 3 200 ns — i.e., a total of 32 addresses — and subsequently so that for the remainder of the time slot — i.e., from 3 200 to 3 900 ns — M3 can, where applicable, receive the write-in address of a new correspondent from the central unit L.

Buffer registers F1, F2, F3 and F4 are provided at the outputs of A1, A2, A3 and A5 respectively; registers F1 and F4 have 8 inputs and 8 outputs and registers F2 and F3 have 11 inputs and 11 outputs. The registers are embodied by known type D bistable flip-flops having a dynamic input G. Charging of the registers is enabled every 100 ns by means of the pulses B1.

Line C4 of FIG. 2 shows the distribution in time at the outputs of register F3 of the write-in addresses into M1 or M2 of a time slot $Xp$ and of the immediately following time slot $Xp + 1$ for the various incoming multiplex channels Y1, Y2, ... and Y32.

Line C5 in FIG. 2 shows the enabling signal for writing octets into any of the stores M1 or M2. Line C6 shows the positioning in time at the outputs of register F2 of the addresses of the correspondents for the outgoing time slots $Xn$ and $Xn + 1$ and for the outgoing multiplex channels Y1 to Y32.

Line C7 represents the sequence in time at the outputs of register F4 of the octets corresponding to the addresses of line C6.

The series-to-parallel converter of the bits of each octet of a time slot leaving the router D comprises: a group of 32 buffer registers T1 to T32 each of the parallel-to-parallel kind and each having 8 inputs connected one each to the 8 outputs of the register F4 and having 8 outputs; and a group of 32 shift registers V1 to V32 each of the parallel-to-series kind and having 8 inputs connected one each to the 8 outputs of one of the buffer registers T1 to T32 and having 1 output connected to a decoder (not shown in FIG. 1).

The buffer register group T1 to T32 is controlled by a 32-output sequencer S5 so synchronized by the time base B that each of the 32 octets appearing consecutively at the outputs of register F4 (during the time slot) is stored in one of the registers T1 to T32. Accordingly, each such register is connected to one of the outputs of S5 which supplies it with a charging pulse every 3 900 ns, such pulses occurring at each output of S5 every 100 ns during a time slot, with a 700 ns interruption after each train of 32 pulses.

During the latter interruption or pause the registers V1 to V32 simultaneously receive a charging pulse for a transfer from each of the registers T1 to T32 to the corresponding following one of the registers V1 to V32. The registers T1 to T32 are then ready to receive the 32 octets of the next time slot.

During a time slot the output registers V1 to V32 simultaneously receive a shift pulse every 400 ns from a sequencer S6, but with an interruption after 7 shift pulses, in the same cadence of transmission as at input E.

Consequently, during at time slot each of the 32 registers V1 to V32 simultaneously outputs to a decoder all the bits of a single octet, in series.

FIG. 2 shows the charging signals for the registers T1, T2, T31 and T32 and the signal C8 for transferring the 32 octets from the registers T1 to T32 to the corresponding output registers V1 to V32.

I claim:

1. In a pulse code modulation (PCM) time division multiplex (TDM) automatic telephone exchange, a connection network for non-blanking transfer of a bit-group transmitted in a time slot from one of N incoming multiplex channels to a time slot in one of N outgoing multiplex channels comprising:

(a) first series-to-parallel converting means having N inputs, each input connected to one of said N incoming multiplex channels, and having M outputs, M corresponding to the number of bits in a bit-group, (b) routing means having M inputs each connected to an output of said series-to-parallel converting means and M outputs, and having a storage facility therein, for simultaneously time and space switching information received in an incoming time slot to an outgoing time slot, (c) parallel-to-series converting means receiving a bit-group of one of said outgoing time slots on said M routing means outputs, and (d) time base means for synchornizing bit-group transfer in said routing means, said series-to-parallel converting means and said parallel-to-series converting means, and for producing a periodic resynchronizing pulse.

2. A connection network as recited in claim 1 wherein said series-to-parallel means comprises:

(a) demultiplexing means for connecting said N incoming multiplex channels to one of two alternate paths and maintaining a connection for the duration of a bit-group, (b) two groups of M shift registers in each group, each register having N positions therein and having N parallel inputs and a single series output, each of said groups of registers having its inputs connected to one of said two alternate paths of said demultiplexing means and having M outputs, (c) first multiplexing means for alternately switching said M outputs of each of said register groups to said routing means, and (d) first sequencing means synchronized by said time base means for controlling said register groups and said demultiplexing means, for causing said register groups to operate in a simplex mode and for causing each of said registers to input a specific, corresponding one of said bits of said bit-group for each incoming multiplex channel.

3. A connection network as recited in claim 1 wherein said parallel-to-series converting means comprises:

(a) N parallel-to-parallel buffer registers each having M inputs and M outputs, each buffer input being connected to outputs of said routing means, (b) a sequencing means synchronized by said time base means for controlling said buffer registers, (c) N parallel-to-series shift registers each having M inputs and a single output, said M inputs of each of said parallel-to-series shift registers being connected to said M outputs of a specific one of said buffer registers, and (d) another sequencing means synchronized by said time base means for controlling said parallel-to-series shift registers.

4. A connection network as recited in claim 1 wherein said routing means comprises:

(a) first and second random-access storage means, operating in simplex for write-in and read-out of said bit-groups, (b) second sequencing means synchronized by said time base for controlling write-in of said bit-groups into one of said first and second storage means, (c) a central control unit for controlling said routing means, and for matching said outgoing and said incoming time slots, (d) third random-access storage means for controlling read-out of one of said first and second storage means, said third storage means being controlled by said central control unit, (e) second and third multiplexing means for simplex routing of said second sequencing means to one of said first and second storage means and for routing said third storage means to the other of said first and second storage means for a single time frame, (f) third sequencing means synchronized by said time base for addressing said third storage means for read-out of one of said bit-groups, (g) fourth multiplexing means for alternately routing to said third storage means addresses supplied by said third sequencing means and by said central control unit, (h) fifth multiplexing means for alternately routing to said M routing means outputs said outputs of said first and second storage means, (i) fourth sequencing means synchronized by said time base for controlling said second, third, fourth and fifth multiplexing means, and (j) buffer register means provided one at the outputs of each of said second, third and fifth multiplexing means and at said inputs of said routing means.

5. A connection network as recited in claim 4 wherein said series-to-parallel means comprises:

(a) demultiplexing means for connecting said N incoming multiplex channels to one of two alternate paths and maintaining a connection for the duration of a bit-group, (b) two groups of M shift registers in each group, each register having N positions therein and having N parallel inputs and a single series output, each of said groups of registers having its inputs connected to one of said two alternate paths of said demultiplexing means and having M outputs, (c) first multiplexing means for alternately switching said M outputs of each of said register groups to said routing means, and (d) first sequencing means synchronized by said time base means for controlling said register groups and said demultiplexing means for causing said register groups to operate in a simplex mode and for causing each of said registers to input a specific, corresponding one of said bits of said bit-group for each incoming multiplex channel.

6. A connection network as recited in claim 5 wherein said parallel-to-series converting means comprises:

(a) N parallel-to-parallel buffer registers each having M inputs and M outputs, each buffer input being connected to outputs of said routing means, (b) fifth sequencing means synchronized by said time base means for controlling said buffer registers, (c) N parallel-to-series shift registers each having M inputs and a single output, said M inputs of each of said parallel-to-series shift registers being connected to said M outputs of a specific one of said buffer registers, and (d) sixth sequencing means synchronized by said time base means for controlling said parallel-to-series shift registers.

7. A connection network as recited in claim 6 wherein:

(a) $M = 8$ and $N = 32$, (b) said first and second random-access storage means each contain 1024 8-bit bytes, (c) said third random-access storage means contains 1024 11-bit addresses, and
(d) said first, second and third random-access storage means each have a maximum access time of 50ns.

8. A connection network as recited in claim 7 wherein said time base means produces 10,240 kHz pulses and, every 4 ms, a 100 ns resynchronizing pulse, and wherein each of said buffer register means comprises D-type bistable flip-flops having a dynamic input G, inputs to said buffer register means being enabled every 100 ns by said 10,240 kHz time base pulse.

* * * * *